(12) United States Patent
Albrecht et al.

(10) Patent No.: US 10,341,249 B2
(45) Date of Patent: Jul. 2, 2019

(54) METHOD FOR UPDATING MESSAGE FILTER RULES OF A NETWORK ACCESS CONTROL UNIT OF AN INDUSTRIAL COMMUNICATION NETWORK ADDRESS MANAGEMENT UNIT, AND CONVERTER UNIT

(71) Applicant: Siemens Aktiengesellschaft, Munich (DE)

(72) Inventors: Harald Albrecht, Nürnberg (DE); Reiner Plonka, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 539 days.

(21) Appl. No.: 14/608,919

(22) Filed: Jan. 29, 2015

(65) Prior Publication Data

US 2015/0215232 A1 Jul. 30, 2015

(30) Foreign Application Priority Data

Jan. 30, 2014 (EP) .................................... 14153303

(51) Int. Cl.
*H04L 12/24* (2006.01)
*H04L 12/911* (2013.01)
(Continued)

(52) U.S. Cl.
CPC ............ *H04L 47/70* (2013.01); *H04L 41/082* (2013.01); *H04L 45/745* (2013.01);
(Continued)

(58) Field of Classification Search
CPC ......... H04L 45/00; H04L 63/08; H04L 47/70; H04L 41/082; H04L 45/745;
(Continued)

(56) References Cited

U.S. PATENT DOCUMENTS 6,963,913 B2 * 11/2005 Komisky ................ H04L 45/00
709/225
7,506,371 B1 * 3/2009 Ben-Natan ............ G06F 21/316
726/18
(Continued)

FOREIGN PATENT DOCUMENTS

CN 1832428 9/2006
CN 101002427 7/2007
(Continued)

*Primary Examiner* — Viet D Vu
(74) *Attorney, Agent, or Firm* — Cozen O'Connor

(57) ABSTRACT

Method and system of updating message filter rules of a network access control unit of an industrial communication network. At least one address-based message filter rule is assigned to the first communication device. The first communication device is replaced with the second communication device, and the second communication device is registered in the address management unit in response to the replacement of the first communication device with the second communication device. Upon determining that a communication device with an identical communication device description is already registered, the address management unit transmits a change message to the network access control unit or to the converter unit. The communication network address of the first communication device is replaced with the communication network address of the second communication device based on the at least one address-based message filter rule.

13 Claims, 1 Drawing Sheet

(51) Int. Cl.
*H04L 12/741* (2013.01)
*H04L 29/12* (2006.01)
*H04L 29/06* (2006.01)
*G05B 19/418* (2006.01)

(52) U.S. Cl.
CPC ...... *H04L 61/2038* (2013.01); *H04L 63/0236* (2013.01); *G05B 19/4185* (2013.01); *H04L 61/2076* (2013.01); *H04L 61/2092* (2013.01); *Y02P 90/18* (2015.11)

(58) Field of Classification Search
CPC ............. H04L 61/2038; H04L 61/2076; H04L 61/2092; G06F 21/316; H04W 4/005; H04W 88/02; G05B 19/4185; Y02P 90/18
USPC .............................. 709/225; 713/201; 726/18
See application file for complete search history.

(56) References Cited

U.S. PATENT DOCUMENTS

| | | | | |
|---|---|---|---|---|
| 7,822,065 | B2* | 10/2010 | Lu | H04W 88/02 370/328 |
| 7,966,659 | B1* | 6/2011 | Wilkinson | H04L 63/0209 726/11 |
| 8,767,564 | B2 | 7/2014 | Nakamoto et al. | |
| 8,983,449 | B1* | 3/2015 | Booth | H04M 3/42263 455/417 |
| 9,451,521 | B2* | 9/2016 | Kapoulas | H04W 36/32 |
| 2003/0074437 | A1 | 4/2003 | Exenberger et al. | |
| 2003/0140132 | A1* | 7/2003 | Champagne | H04L 41/082 709/223 |
| 2003/0229686 | A1* | 12/2003 | Kortright | H04L 41/082 709/220 |
| 2005/0203645 | A1* | 9/2005 | Klopfer | G05B 9/02 700/79 |
| 2005/0268335 | A1* | 12/2005 | Le | H04L 63/0263 726/13 |
| 2006/0047803 | A1* | 3/2006 | Shaik | H04L 29/12301 709/224 |
| 2006/0059154 | A1* | 3/2006 | Raab | G06F 21/6227 |
| 2007/0006293 | A1* | 1/2007 | Balakrishnan | H04L 63/0245 726/13 |
| 2007/0061455 | A1* | 3/2007 | Callaghan | H04L 63/08 709/225 |
| 2007/0076724 | A1* | 4/2007 | Hall | H04L 29/12066 370/395.52 |
| 2007/0105589 | A1* | 5/2007 | Lu | H04W 88/02 455/556.2 |
| 2007/0283014 | A1* | 12/2007 | Shinomiya | H04L 12/2856 709/225 |
| 2009/0221279 | A1* | 9/2009 | Rutledge | H04M 1/72577 455/418 |
| 2009/0262382 | A1 | 10/2009 | Nobutani | |
| 2013/0166965 | A1* | 6/2013 | Brochu | A61H 33/00 714/48 |
| 2013/0167196 | A1* | 6/2013 | Spencer | H04W 8/22 726/3 |
| 2013/0332562 | A1* | 12/2013 | Naidu | H04L 65/1016 709/217 |
| 2013/0332617 | A1* | 12/2013 | Aoki | H04L 63/08 709/227 |
| 2014/0181279 | A1* | 6/2014 | Louis | H04W 12/02 709/222 |
| 2014/0280973 | A1* | 9/2014 | Clancy, III | H04L 5/0037 709/226 |
| 2015/0020152 | A1* | 1/2015 | Litichever | H04L 63/14 726/1 |
| 2015/0139243 | A1* | 5/2015 | Nguyen | H04L 45/745 370/392 |
| 2015/0141018 | A1* | 5/2015 | Kapoulas | H04W 36/0083 455/437 |
| 2015/0141021 | A1* | 5/2015 | Kapoulas | H04W 36/32 455/441 |
| 2015/0271775 | A1* | 9/2015 | Wu | H04W 60/06 370/310 |

FOREIGN PATENT DOCUMENTS

| | | |
|---|---|---|
| CN | 101103607 | 1/2008 |
| DE | 10146397 | 4/2003 |
| EP | 1 024 636 | 8/2000 |
| EP | 2 367 337 | 9/2011 |
| EP | 2 400 708 | 12/2011 |
| WO | WO 2006/005991 | 1/2006 |

* cited by examiner

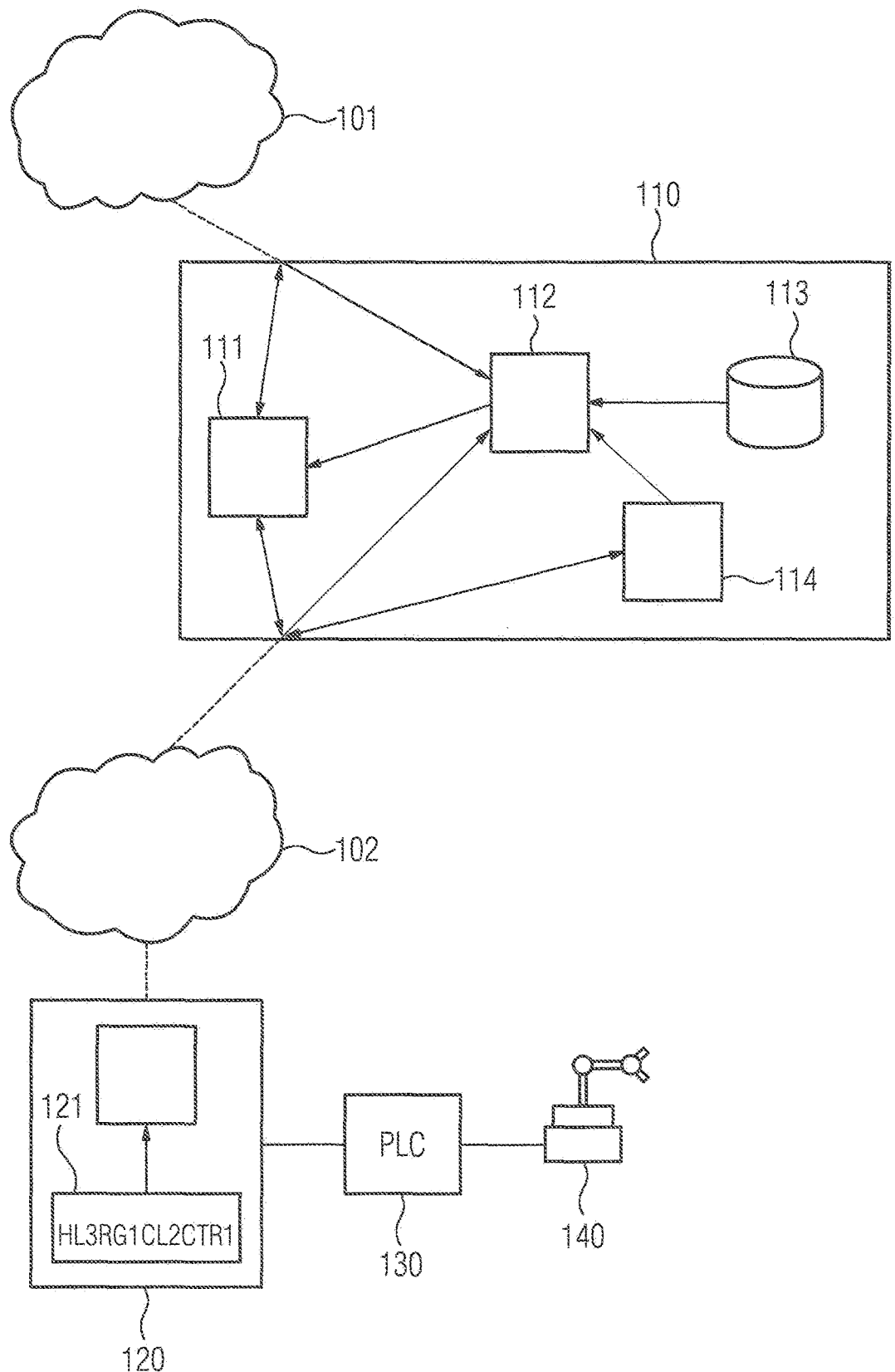

METHOD FOR UPDATING MESSAGE FILTER RULES OF A NETWORK ACCESS CONTROL UNIT OF AN INDUSTRIAL COMMUNICATION NETWORK ADDRESS MANAGEMENT UNIT, AND CONVERTER UNIT

BACKGROUND OF THE INVENTION

EP 1 024 636 B1 describes a method for configuring a safety device in a communication device, in which the communication device can be connected via a network connection unit to a local network having a plurality of communication units. The communication units and the network connection unit are each assigned a first address identifying the respective unit and a second address identifying the respective unit and the local network thereof. For the determination of the first addresses of the communication units by the network connection unit, in each case, a request message is sent to all the addressable units which are determined in the local network using the second address of the network connection unit. Within the scope of the request message, a communication unit is addressed by its second address.

In cases wherein a communication unit transmits back a confirmation message to the network connection unit owing to a received request message, the first address of the communication unit, which is also transmitted in this context, is stored in the safety device, with an assignment to the respective communication unit.

DE 101 46 397 B4 discloses a method for configuring a firewall or a router, wherein a first computer or a first computer network is connected via the firewall or the router to a second computer network. The router or the firewall is configured such that a computer communication between a computer of the second computer network and the first computer or a predefined computer of the first computer network is made possible. In this context, a prefabricated request form, which is assigned to the respective computer communication, is filled-in. The request form is based on a technical risk analysis that has been produced once and is assigned to the respective computer communication. Furthermore, the filled-in request form is converted into a code which is suitable for the configuration of the firewall or of the router. The firewall or the router is automatically configured as a function of the code.

EP 2 400 708 B1 discloses a network protection device for controlling the communication between an external data processing device outside an automation network and an automation device in the automation network. An automation protocol is provided for communication with the automation device. Protocol rules are stored in the network protection device. These protocol rules comprise prescriptions that make a decision about passing on or not passing on a protocol message of the automation protocol dependent on the content of the protocol message. The network protection device is configured to make a decision about passing on or not passing on an incoming protocol message of the automation protocol in accordance with the prescriptions of the protocol rules. Furthermore, the protocol rules stored in the network protection device comprise prescriptions that make a decision whether to pass on or not to pass on the protocol message based on an operating state of one or more elements of the automation network or one or more devices connected to the automation network.

When there are dynamically changing communication network addresses, previous approaches for the configuration of firewalls are of limited practical value since they basically require static communication network addresses to which firewall filter rules relate. This problem will increase even further with IPv6 since communication devices with IPv6 can generate their communication network addresses independently and in a decentralized fashion.

In one aspect, the present application provides a method for the efficient updating of message filter rules of a network access control unit in communication network addresses that are dynamically changing or assigned in a decentralized fashion, and suitable technical ways of implementing the method.

In one embodiment of updating message filter rules of a network access control unit of an industrial communication network, a first communication device (to which at least one address-based message filter rule is assigned) is registered with its communication network address and a device description in an address management unit when activation occurs. In this context, the device description comprises at least one function indication or topology indication. Address-based message filter rules are applied by the network access control unit. The network access control unit can be, for example, a firewall for data frames or data packets. When the first communication device is replaced by a second communication device, the second communication device is registered in the address management unit. In this context, a communication network address and a device description of the second communication device are acquired.

During the registration of the second communication device, the address management unit of the present application checks whether a communication device with an identical device description is already registered. In the event of a positive check result, the address management unit transmits a change message relating to the registration of the second communication device, which has an identical device description to that of the first communication device, to the network access control unit or to a converter unit. In this context, the change message comprises at least the communication network address and the device description of the second communication device.

When the change message is received, the communication network address of the first communication device is replaced by the communication network address of the second communication device in the at least one address-based message filter rule. In this way, message filter rules can be adapted quickly and reliably to communication network addresses that change dynamically or are assigned in a decentralized way. In addition, existing firewalls can continue to be used. Only functionalities of the address management unit and of the converter unit are replaced.

An industrial communication network usually serves in an industrial automation system to link a multiplicity of industrial automation devices to one-another. The industrial automation devices are provided within the scope of fabrication automation or process automation to perform open-loop or closed-loop control of systems, machines and devices. Due to time-critical peripheral conditions in technical systems that are automated by industrial automation devices, real-time communication protocols such as PROFINET, PROFIBUS or Real-Time Ethernet are typically used in industrial communication networks for communicating between automation devices. Accordingly, efficient application and updating of message filter rules in network access control units such as firewalls is required.

SUMMARY OF THE INVENTION

In one embodiment, message filter rules are defined based on device descriptions. In this context, message filter rules that are defined on the basis of device descriptions are converted into address-based message filter rules by the converter unit and transmitted to the network access control unit. The change message related to the registration of the second communication device with an identical device description to that of the first communication device is transmitted to the converter unit. In one embodiment, the converter unit is connected, for example, to a memory unit for message filter rules that are defined on the basis of device descriptions. In this case, the converter unit accesses the memory unit, at least to perform reading, in order to update address-based message filter rules.

This permits reliable and efficient management of message filter rules. Message filter rules that are defined on the basis of device descriptions remain unchanged when a device is replaced. As a result, message filter rules can be defined clearly in advance for robust data flow control.

In one embodiment, the replacement of the first communication device by the second communication device can also be performed logically. In this regard, the first communication device differs from the second communication device only in its communication network address. The replacement in this example is a change of address. Accordingly, in one embodiment, the method described herein can also be applied in the event of a change of address.

In one embodiment, a group of first communication devices are provided with a first network address prefix, and a group of second communication devices are be provided with a second network address prefix. The groups of the communication devices therefore differ only in the network address prefix. In this regard, the replacement is a change of prefix for a group of communication devices. In one embodiment, the change of prefix is registered in the address management unit by a single communication device that is assigned to the group, in a collective fashion for all the communication devices of the group. For example, a possible scenario for a change of prefix may be a change of the sub-network or a change of the sub-network address.

In one embodiment, upon determining correspondence between the device descriptions of the first and second communication devices, the address management unit deletes the registration of the first communication device. This permits consistent and redundancy-free address management. In one embodiment, within the industrial communication network at least the first and second communication devices automatically define their respective communication network address. This results in additionally reduced address management expenditure. The communication network addresses of the first and second communication devices may be, for example, IPv6 addresses.

In one embodiment, the address management unit for an industrial communication network is configured to carry out a method as described above. In particular, the address management unit is configured to register communication devices with a respective communication network address and device description when the respective communication device is activated. In this embodiment, the device description comprises at least one function indication or topology indication. Furthermore, the address management unit is configured to determine whether a registered second communication device has an identical device description to that of a first communication device that is registered earlier. Furthermore, the address management unit is configured to transmit a change message to a network access control unit or to a converter unit in the event of a positive check result. In this embodiment, the change message comprises at least the communication network address and the device description of the second communication device. In one aspect, the address management unit discussed herein permits simple integration of a method as described above into an existing industrial communication network.

In one embodiment, the converter unit is configured to carry out a method as described above. In one embodiment, the converter unit is configured to replace a communication network address of an exchanged first communication device in at least one address-based message filter rule by a communication network address of an exchanging second communication device with an identical device description when a change message is received from an address management unit. In this embodiment, the device description comprises at least one function indication or topology indication, while the change message comprises at least the communication network address and the device description of the second communication device. The converter unit permits existing firewalls with address-based filter rules to be used.

BRIEF DESCRIPTION OF THE DRAWING

The properties, features, and advantages of the present invention that are described above and also the manner in which they are achieved will become cleared and more distinctly comprehensible in connection with the description that follows for the exemplary embodiments, which are explained in more detail below using an exemplary embodiment and with reference to the drawing, in which:

FIG. 1 illustrates an industrial communication network with a firewall, an address management unit and a filter rule converter unit.

DETAILED DESCRIPTION OF THE PRESENTLY PREFERRED EMBODIMENTS

The industrial communication network illustrated in FIG. 1 comprises a first unsecured partial network 101, a firewall system 110 connected thereto, a communication device 120 which is connected to the firewall system 110 via a second secured partial network 102, and a store-programmable control unit 130, connected to the communication device 120, for a machine or a robot 140.

The communication device 120 is assigned at least one address-based message filter rule that is applied by a network access control unit 111 or packet filter unit ill of the firewall system 110. When activation occurs, the communication device 120 is registered with its communication network address and a technological name or a device description 121 in an address management unit 114 of the firewall system. In one embodiment, the device description 121 comprises at least one function indication or topology indication. The communication device 120 defines its communication network address automatically. In the present exemplary embodiment, the communication network address of the communication device 120 is an IPv6 address.

Message filter rules are firstly defined symbolically based on device descriptions and stored accordingly in a rule database 113 of the firewall system 110. A converter unit 112 of the firewall system 110 accesses this rule database 113, the converter unit 112 converting the symbolically defined message filter rules into address-based message filter rules and making them available (i.e, in a converted form) to the packet filter unit 111.

When the communication device 120 is replaced by a replacement communication device, the replacement communication device is registered in the address management unit 114. In this example, the communication network address and the device description of the replacement communication device are acquired. The replacement communication device also defines its IPv6 communication network address automatically.

The address management unit 114 checks (during the registration of the replacement communication device) whether a communication device with an identical device description was previously registered. In the case of a positive check result, the address management unit 114 transmits a change message to the converter unit 112 relating to the registration of the replacement communication device with an identical device description to that of the replaced communication device 120. The change message comprises at least the communication network address and the device description of the replacement communication device. In one example, when correspondence is detected between the device descriptions of the replaced communication device 120 and of the replacement communication device, the address management unit 114 deletes the registration of the replaced communication device 120.

In response to the change message, the converge unit 112 replaces the communication network address of the replaced communication device 120 in the address-based message filter rules by the communication network address of the replacement communication device. To update address-based message filter rules, the converter unit 112 calls the symbolically defined message filter rules for the replaced communication device 120 from the rule database 113, which is connected to said converter unit 112. The converter unit 112 subsequently converts the message filter rules into address-based message filter rules for the packet filter unit 111 using the communication network address of the replacement communication device. In the example of a pure replacement of the device, the message filter rules that are defined symbolically on the basis of device descriptions remain substantially unchanged.

The address management unit 114 is provided generally to register communication devices with a respective communication network address and device description when the respective communication device is activated. To that end, the address management unit 114 is configured to check whether a newly registered communication device has an identical device description to that of a communication device registered earlier. Furthermore, the address management unit 114 is configured to transmit a change message to the converter unit 112 in the event of a positive check result. The converter unit 112 is correspondingly configured to replace the communication network address of the replaced communication device in address-based message filter rules by the communication network address of the replacement communication device when a change message is received. Both the address management unit 114 and the converter unit 112 can be implemented as programmable, computer-based units or application entities.

As is indicated by an arrow from the first partial network 101 in the direction of the firewall system 110, in one aspect, the method described above can also be applied to a group of first communication devices and a group of second communication devices that differ from one another only in a network address prefix. In this embodiment, the above-described replacement corresponds to a change of a prefix for a group of communication devices. A collective registration of the change of a prefix in the address management unit 114 is advantageously carried out by a single communication device, assigned to the group, for all the communication devices of the group.

What is claimed is:

1. A method of updating message filter rules of a network access control unit within a firewall system of an industrial communication network including a first communication device, a second communication device, the firewall system further including an address management unit and a converter unit, the method comprising:
    assigning at least one address-based message filter rule defined symbolically based on device descriptions to the first communication device;
    registering the at least one address-based message filter rule defined symbolically based on device descriptions with a corresponding communication network address and a communication device description in the address management unit of the firewall system further including the network access control unit and the converter unit upon identifying an activation, the communication device description comprising at least one of a function indication and a topology indication;
    replacing the first communication device with the second communication device, and registering the second communication device in the address management unit of the firewall system further including the network access control unit and the converter unit in response to the replacement of the first communication device with the second communication device such that a communication network address and a communication device description of the second communication device are acquired;
    checking, by the address management unit of the firewall system further including the network access control unit and the converter unit, during the registration of the second communication device, whether a communication device with an identical communication device description is already registered;
    upon determining that there is a positive check result by the address management unit of the firewall system further including the network access control unit and the converter unit, the address management unit of the firewall system transmitting a change message relating to the registration of the second communication device with a communication device description that is identical to that of the first communication device to the network access control unit or to the converter unit, the change message comprising at least the communication network address and the communication device description of the second communication device; and
    upon receiving the change message, replacing the communication network address of the first communication device with the communication network address of the second communication device based on the at least one address-based message filter rule defined symbolically based on device descriptions to update the message filter rules of the firewall system including the address management unit, the network access control unit and the converter unit of the industrial communication network.

2. The method as claimed in claim 1, wherein the address-based message filter rules defined symbolically based on device descriptions are applied by the network access control unit.

3. The method as claimed in claim 2, further comprising:
    converting the message filter rules into address-based message filter rules defined symbolically based on device descriptions by the converter unit; and transmitting the converted message filter rules defined symbolically based on device descriptions to the network access control unit.

4. The method as claimed in claim 3, further comprising: transmitting to the converter unit within the firewall system the change message relating to the registration of the second communication device having a communication device description that is identical to that of the first communication device.

5. The method as claimed in claim 3, further comprising: connecting the converter unit within the firewall system to a memory unit for message filter rules defined symbolically based on device descriptions;
accessing and reading the memory unit, by the converter unit within the firewall system; and
updating the address-based message filter rules in response to the accessing and reading the memory unit.

6. The method as claimed in claim 5, wherein the message filter rules that are defined symbolically based on the device descriptions remaining unchanged upon replacing a communication device.

7. The method as claimed in claim 1, further comprising: deleting the registration of the first communication device upon detecting a correspondence between the device descriptions of the first and second communication devices.

8. The method as claimed in claim 1, further comprising: automatically defining the communication network addresses of the first and second communication devices, respectively, within the industrial communication network.

9. The method as claimed in claim 1, wherein the communication network addresses of the first and second communication devices are IPv6 addresses.

10. The method as claimed in claim 1, wherein the network access control unit is a firewall for at least one of data frames and data packets.

11. The method as claimed in claim 1, wherein:
the replacement of the first communication device with the second communication device takes place logically;
the first communication device differs from the second communication device only in its communication network address; and
the replacement of the first communication device with the second communication device comprises a change of address.

12. The method as claimed in claim 1, wherein:
a group of first communication devices and a group of second communication devices are provided;
the groups of first communication devices and second communication devices differ only in a network address prefix;
a replacement of the first group of communication devices with the second group of communication devices comprises a change of a network address prefix for a group of communication devices; and
the change of the network address prefix is registered in the address management unit by the communication device that is assigned to the respective group.

13. An address management unit within a firewall system of an industrial communication network, the network comprising:
a first communication device;
a second communication device; and
a converter unit;
wherein the address management unit within the firewall system is configured to register the communication devices, upon activation of the respective communication device;
wherein each communication device includes a respective communication network address and a device description;
wherein the device description comprises at least one of a function indication and topology indication;
wherein the address management unit within the firewall system is configured to check whether a registered second communication device has a device description that is identical to that of the first communication device that is registered earlier;
wherein the address management unit within the firewall system is configured to transmit a change message to one of a network access control unit within the firewall system and to the converter unit upon determining a positive check result to update message filter rules of the network access control unit defined symbolically based on the device description within the firewall system of the industrial communication network; and
wherein the change message comprises at least the communication network address and the device description of the second communication device.

* * * * *